(12) United States Patent
Song et al.

(10) Patent No.: US 11,561,158 B2
(45) Date of Patent: Jan. 24, 2023

(54) MEASURING DEVICE AND METHOD FOR GAS SOLUBILITY IN NATURAL GAS HYDRATE SOLUTION SYSTEM

(71) Applicant: DALIAN UNIVERSITY OF TECHNOLOGY, Dalian (CN)

(72) Inventors: Yongchen Song, Dalian (CN); Jiafei Zhao, Dalian (CN); Lunxiang Zhang, Dalian (CN); Tian Wang, Dalian (CN); Lingjie Sun, Dalian (CN); Yi Zhang, Dalian (CN); Xiang Sun, Dalian (CN); Lei Yang, Dalian (CN); Zheng Ling, Dalian (CN); Yanghui Li, Dalian (CN); Weiguo Liu, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 17/764,476

(22) PCT Filed: May 28, 2021

(86) PCT No.: PCT/CN2021/096590
§ 371 (c)(1),
(2) Date: Mar. 28, 2022

(87) PCT Pub. No.: WO2021/244406
PCT Pub. Date: Dec. 9, 2021

(65) Prior Publication Data
US 2022/0341833 A1    Oct. 27, 2022

(30) Foreign Application Priority Data

Jun. 3, 2020 (CN) .......................... 202010496352.6

(51) Int. Cl.
*G01N 5/00* (2006.01)
*G01N 7/14* (2006.01)
(Continued)

(52) U.S. Cl.
CPC ................. *G01N 7/14* (2013.01); *G01N 1/14* (2013.01); *G01N 1/34* (2013.01); *G01N 1/38* (2013.01); *G01N 5/00* (2013.01)

(58) Field of Classification Search
CPC .. G01N 7/14; G01N 1/14; G01N 1/34; G01N 1/38; G01N 5/00
(Continued)

(56) References Cited

FOREIGN PATENT DOCUMENTS

| CN | 105699247 A | 6/2016 |
|---|---|---|
| CN | 105806738 A | 7/2016 |

(Continued)

*Primary Examiner* — Robert R Raevis
(74) *Attorney, Agent, or Firm* — Muncy, Geissler, Olds & Lowe, P.C.

(57) ABSTRACT

The present invention belongs to the field of gas solubility measurement, and provides a measuring device and method for gas solubility in a natural gas hydrate solution system. The measuring device mainly comprises a reaction system, a sampling system and a data analysis system. The present invention can be used for measuring gas solubility in a natural gas hydrate solution system at different temperature, pressure and salt ion conditions, and exploring influence of different environmental conditions on the gas solubility when hydrate-liquid water biphase equilibrium is achieved. The present invention in characterized in that the structure is simple, the operation is easy, sampling is carried out at a constant pressure to avoid damage to phase equilibrium and dissolution equilibrium of the systems, and a microfilter is used to ensure that a liquid sample taken does not contain hydrate crystals, so that experimental data has a relatively high accuracy.

6 Claims, 1 Drawing Sheet

(51) Int. Cl.
*G01N 1/14* (2006.01)
*G01N 1/34* (2006.01)
*G01N 1/38* (2006.01)

(58) Field of Classification Search
USPC .............................................. 73/19.01, 19.1
See application file for complete search history.

(56) References Cited

FOREIGN PATENT DOCUMENTS

| | | |
|---|---|---|
| CN | 106950149 A | 7/2017 |
| CN | 110261259 A | 9/2019 |
| CN | 111579424 A | 8/2020 |
| KR | 20120099956 A | 9/2012 |
| KR | 20160123636 A | 10/2016 |

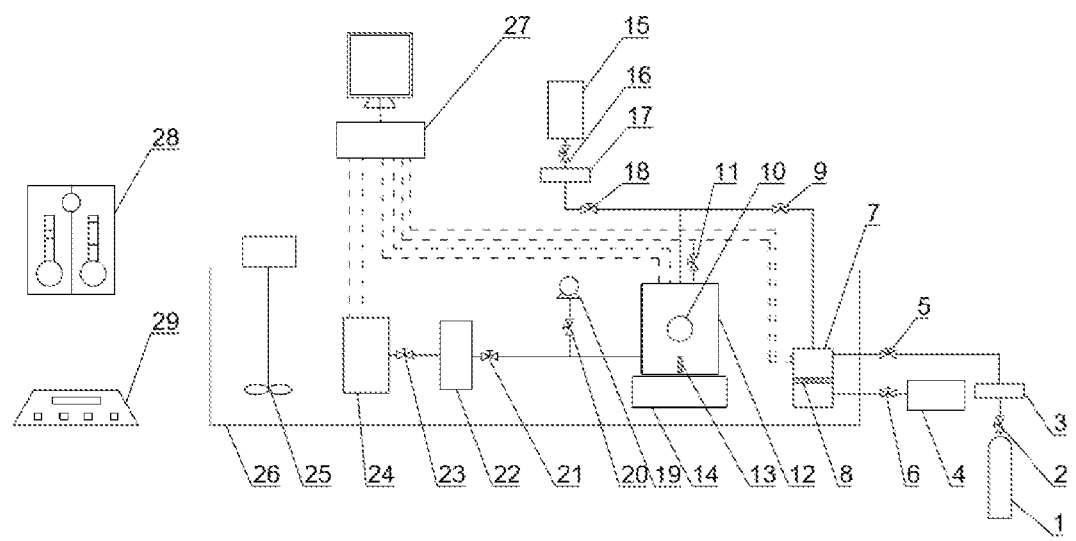

MEASURING DEVICE AND METHOD FOR GAS SOLUBILITY IN NATURAL GAS HYDRATE SOLUTION SYSTEM

TECHNICAL FIELD

The present invention relates to the field of gas solubility measurement, in particular to a measuring device and method for gas solubility in a natural gas hydrate solution system.

BACKGROUND

Natural gas hydrate, as a new clean energy resource to replace coal, oil and natural gas in the 21st century, has attracted worldwide attention due to its high energy density, excellent resource density and wide distribution worldwide, and is considered to be one of the strategic resources with the best commercial development prospects in the future. Natural gas hydrate is mainly distributed in the deep seabed along the continental shelf and in the inland permafrost zone, and is most widely distributed and abundant in the bottom of the ocean.

Gas solubility measurement plays an important role in the fields of practical engineering and scientific research related to natural gas hydrate. In the field of practical engineering, as the main component of natural gas hydrate is methane, the solution in which natural gas hydrate exists in the natural world contains a high concentration of methane gas, and therefore, it is of great significance to accurately measure gas solubility of methane in a natural gas hydrate solution system for studying the formation and accumulation of the hydrate in seabed and predicting the formation, distribution and evolution of natural gas hydrate in porous marine sediments; at the same time, during marine natural gas hydrate exploitation, it can be determined whether methane leakage occurs during hydrate exploitation by measuring the gas solubility of methane in seawater, thus to improve the safety of exploitation engineering. In the field of scientific research, the gas solubility of methane in the natural gas hydrate solution system will determine interphase mass transfer and influence the overall conversion rate of hydrate, and therefore, in the natural gas hydrate solution system, accurate measurement of gas solubility of methane is favorable for better understanding of hydrate formation dynamics.

To sum up, it is urgent to carry out experimental research on gas solubility measurement in the natural gas hydrate solution system and clarify the exact value of gas solubility in the natural gas hydrate solution system and the action law of various influencing factors on gas solubility. The existence of hydrate will change the tendency of gas solubility varying with temperature and pressure conditions, so that the gas solubility in a solution with or without hydrate will be greatly different in the same external conditions. Therefore, a traditional gas solubility measuring device cannot meet the requirements for measurement and prediction of real gas solubility in the natural gas hydrate solution system. In view of this problem, the present invention provides a measuring device and method for gas solubility in a natural gas hydrate solution system. The measuring method and device can be used to carry out measurement experiment on gas solubility of methane in the natural gas hydrate solution system in different temperature, pressure and salinity conditions, and thus to ascertain the exact value of gas solubility of methane in different external conditions and the action law of various correlation factors on gas solubility of methane.

SUMMARY

The purpose of the present invention is to provide a measuring device and method for gas solubility in a natural gas hydrate solution system, so as to solve the technical problem that gas solubility in a solution is difficult to predict in the presence of hydrate and provide a technical basis for obtaining gas solubility data of methane necessary for the experimental research of natural gas hydrate.

To achieve the above purpose, the present invention adopts the following technical solution:

A measuring device for gas solubility in a natural gas hydrate solution system, comprising a reaction system, a sampling system and a data analysis system; a core device of the reaction system is a balancing chamber which is used as a gas dissolving and hydrate generating device; auxiliary devices of the balancing chamber include a gas sample bottle, a water storage tank, an electromagnetic stirring rod, an electromagnetic stirrer, a surge tank, a gas injection high pressure metering pump, a water injection high pressure metering pump and a temperature adjusting tank; a core device of the sampling system is an expansion chamber which is used as a liquid sample collecting device; auxiliary devices of the expansion chamber include a microfilter, a balancing chamber, a surge tank and an electric pump; the data analysis system comprises a data acquisition device, a gas meter and an analytical balance;

The reaction system comprises the gas sample bottle, the gas injection high pressure metering pump, the surge tank, the balancing chamber, the electromagnetic stirring rod, the electromagnetic stirrer, the water storage tank, the water injection high pressure metering pump and the temperature adjusting tank; the surge tank, the balancing chamber and the electromagnetic stirrer are located in the temperature adjusting tank; the gas sample bottle is connected to the gas injection high pressure metering pump through a pipeline with a first valve; the surge tank is internally provided with a piston and divided by the piston into an upper chamber and a lower chamber, a temperature sensor and a pressure sensor are installed in the upper chamber of the surge tank, and the upper chamber of the surge tank is connected to the gas injection high pressure metering pump through a pipeline with a second valve; the balancing chamber, as a gas dissolving and hydrate generating device, is provided with a visualization window, a temperature sensor and a pressure sensor, is connected to the water injection high pressure metering pump through a sample inlet valve, and is connected to the upper chamber of the surge tank through a pipeline with a gas inlet valve; the electromagnetic stirring rod is placed in the balancing chamber and is driven by the electromagnetic stirrer installed at the bottom; the water storage tank is connected to the water injection high pressure metering pump through a pipeline with a fourth valve;

The sampling system comprises the electric pump, the microfilter, the expansion chamber, and the surge tank and the balancing chamber shared with the reaction system; the electric pump is connected to the lower chamber of the surge tank through a third valve, and the electric pump is used in conjunction with the surge tank provided with the movable piston to keep pressure in the balancing chamber constant during sampling; the microfilter is connected to the balancing chamber through a first sampling valve; the expansion chamber is internally provided with a temperature sensor and a pressure sensor, and is connected to the microfilter through a pipeline of a second sampling valve; the microfilter and the expansion chamber are also placed in the temperature adjusting tank;

Main devices of the data analysis system mainly include the data acquisition device, the gas meter, the analytical balance, and the expansion chamber shared with the sampling system; the temperature sensors and the pressure sensors in the surge tank, the balancing chamber and the expansion chamber are connected to the data acquisition device; the gas meter and the analytical balance are used for flash data analysis of a sample taken in the expansion chamber.

The temperature adjusting tank is internally installed with a stirrer driven by a motor.

The balancing chamber is internally installed with the electromagnetic stirring rod which is driven by the electromagnetic stirrer installed at the bottom.

The balancing chamber is connected to a vacuum pump through a pipeline with a valve and is used for degassing the systems.

The temperature sensors and the pressure sensors in the balancing chamber, the surge tank and the expansion chamber are connected to the data acquisition device in the data analysis system.

The expansion chamber has a known volume and mass, and is used in conjunction with the analytical balance and the gas meter for flash data analysis of a sample.

A method for measuring gas solubility in a hydrate-containing liquid by the above-mentioned device, specifically comprising the following steps:

1) Cleaning the balancing chamber, connecting experimental devices, and conducting pressure test and inspection on a measuring system;

2) Using the vacuum pump to vacuumized the experimental devices and the pipelines, and then closing all valves;

3) Opening the sample inlet valve, and using the water storage tank and the water injection high pressure metering pump to fill up the balancing chamber with solvent liquid;

4) Opening the second valve and the gas inlet valve, charging methane gas into the balancing chamber by the gas bottle and the gas injection high pressure metering pump, and then monitoring temperature and pressure in the balancing chamber;

5) Adjusting temperature in the temperature adjusting tank to a hydrate generating temperature, and keeping this temperature constant, achieving equilibrium in the balancing chamber when it is detected that the pressure in the balancing chamber is constant for a long time;

6) Opening the first sampling valve, and filtering a solution sample with the microfilter to ensure that the liquid sample taken does not contain hydrate crystals;

7) Opening the second sampling valve, after collecting a certain amount of sample into the pre-vacuumized expansion chamber, removing the expansion chamber from the measuring system, and completing sample collection;

8) During sampling, opening the third valve and the gas inlet valve, conducting pressurization by the electric pump, and keeping the pressure in the balancing chamber constant during sampling;

9) Using the analytical balance to weigh the expansion chamber and obtain a sample mass m, flashing the sample into a gas phase and a liquid phase at atmospheric pressure and room temperature, and measuring a gas volume $V_g$ after flash by the gas meter;

10) Solubility calculation

Obtaining gas solubility $S_H$ in a natural gas hydrate water solution by calculating from a mole number $n_g$ of gas and a mole number $n_w$ of water in the water solution according to a formula $$S_H = \frac{n_g}{n_g + n_w},$$

where $n_g$ and $n_w$ can be obtained by calculating from a gas molar mass $M_g$, a water molar mass $M_w$, a gas constant R, a flash temperature T, a gas fugacity $f_g$, a Henry's law constant H, and the sample mass m and the gas volume $V_g$ after sample flash obtained in step 9) according to formulas $$n_g = \frac{f_g V_g}{RT} + n_w \frac{f_g}{H} \text{ and } n_w = \frac{m - M_g \frac{f_g V_g}{RT}}{M_w + \frac{f_g}{H} M_g}.$$

Obtaining gas solubility $S_B$ in a natural gas hydrate salt solution by calculating from the mole number $n_g$ of gas, the mole number $n_w$ of water and a mole number $n_s$ of salt according to a formula $$S_B = \frac{n_g}{n_g + n_w + n_s},$$

wherein as the gas solubility in the salt solution is also influenced by a salting out constant $K_s$ and an ion concentration I, the gas mole number $$n_g = \frac{f_g V_g}{RT} + n_w \frac{f_g}{H} \times 10^{-K_s I}.$$

11) To ensure test accuracy, repeating the experiment for more than three times to ensure the consistency of experimental results.

The present invention has the following beneficial effects: magnetic stirring devices are used for stirring during gas dissolution and hydrate generation, which accelerates gas dissolution and effectively promotes hydrate generation. The electric pump and the surge tank with the piston are used, which ensures that the pressure in the balancing chamber is constant during sampling and avoids damage to phase equilibrium and dissolution equilibrium of the systems. The microfilter is used to filter hydrate crystals during sampling, which ensures the accuracy of measurement results.

DESCRIPTION OF DRAWINGS

FIG. 1 is a structural schematic diagram of an apparatus of the present invention.

In the figures: 1 gas sample bottle; 2 first valve; 3 gas injection high pressure metering pump; 4 electric pump; 5 second valve; 6 third valve; 7 surge tank; 8 piston; 9 gas inlet valve; 10 visualization window; 11 safety valve; 12 balancing chamber; 13 electromagnetic stirring rod; 14 electromagnetic stirrer; 15 water storage tank; 16 fourth valve; 17 water injection high pressure metering pump; 18 sample inlet valve; 19 vacuum pump; 20 fifth valve; 21 first sampling valve; 22 microfilter; 23 second sampling valve; 24 expansion chamber; 25 stirrer; 26 temperature adjusting tank; 27 data acquisition device; 28 gas meter; and 29 analytical balance.

DETAILED DESCRIPTION

Solubility measurement by the present invention will be described below in detail in combination with drawings.

Referring to FIG. 1, a measuring device for gas solubility in a natural gas hydrate solution system proposed by the present invention, comprising a gas sample bottle 1, a first valve 2, a gas injection high pressure metering pump 3, an electric pump 4, a second valve 5, a third valve 6, a surge tank 7, a piston 8, a gas inlet valve 9, a visualization window 10, a safety valve 11, a balancing chamber 12, an electromagnetic stirring rod 13, an electromagnetic stirrer 14, a water storage tank 15, a fourth valve 16, a water injection high pressure metering pump 17, a sample inlet valve 18, a vacuum pump 19, a fifth valve 20, a first sampling valve 21, a microfilter 22, a second sampling valve 23, an expansion chamber 24, a stirrer 25, a temperature adjusting tank 26, a data acquisition device 27, a gas meter 28 and an analytical balance 29.

The measuring device for gas solubility in a natural gas hydrate solution system, comprising a reaction system, a sampling system and a data analysis system, wherein the reaction system comprises the gas sample bottle 1, the gas injection high pressure metering pump 3, the surge tank 7, the balancing chamber 12, the electromagnetic stirring rod 13, the electromagnetic stirrer 14, the water storage tank 15, the water injection high pressure metering pump 17 and the temperature adjusting tank 26; the surge tank 7 is internally provided with the piston 8 and divided by the piston 8 into an upper chamber and a lower chamber, a temperature sensor and a pressure sensor are installed in the upper chamber of the surge tank 7, and the upper chamber of the surge tank 7 is connected to the gas injection high pressure metering pump 3 through a pipeline with the second valve 5; the balancing chamber 12, as a gas dissolving and hydrate generating device, is provided with the visualization window 10, a temperature sensor and a pressure sensor, is connected to the water injection high pressure metering pump 17 through the sample inlet valve 18, and is connected to the upper chamber of the surge tank 7 through a pipeline with the gas inlet valve 9; the surge tank 7, the balancing chamber 12 and the electromagnetic stirrer 14 are located in the temperature adjusting tank 26; the electromagnetic stirring rod 13 is placed in the balancing chamber and is driven by the electromagnetic stirrer 14 installed at the bottom, so as to realize rapid dissolution of gas in a solution and rapid generation of hydrate by stirring; the gas sample bottle 1 is connected to the gas injection high pressure metering pump 3 through a pipeline with the first valve 2; the water storage tank 15 is connected to the water injection high pressure metering pump 17 through a pipeline with the fourth valve 16;

The sampling system comprises the electric pump 4, the microfilter 22, the expansion chamber 24, and the surge tank 7 and the balancing chamber 12 shared with the reaction system; the electric pump 4 is connected to the lower chamber of the surge tank 7 through the third valve 6, and the electric pump 4 is used in conjunction with the surge tank 7 provided with the movable piston 8 to keep pressure in the balancing chamber 12 constant during sampling, so as to avoid damage to phase equilibrium and dissolution equilibrium of the systems by sampling; the microfilter 22 is connected to the balancing chamber 12 through a first sampling valve 21, so as to remove hydrate crystals contained in a liquid sample during sampling; the expansion chamber 24, as a liquid sample collecting device, is internally provided with a temperature sensor and a pressure sensor, and is connected to the microfilter 22 through a pipeline of the second sampling valve 23; the microfilter 22 and the expansion chamber 24 are also placed in the temperature adjusting tank 26;

Main devices of the data analysis system mainly include the data acquisition device 27, the gas meter 28, the analytical balance 29, and the expansion chamber 24 shared with the sampling system; the temperature sensors and the pressure sensors in the surge tank 7, the balancing chamber 12 and the expansion chamber 24 are connected to the data acquisition device 27; the gas meter 28 is used for measuring a gas volume after sample flash, and the analytical balance 29 is used for measuring mass of the sample taken; the gas meter 28 and the analytical balance 29 are used in conjunction for flash data analysis of the sample taken in the expansion chamber 24.

In this example, the measuring device for gas solubility in a natural gas hydrate solution system is used to measure gas solubility of methane in a natural gas hydrate water solution in the condition that $T_0=3°$ C. and $P_0=5.0$ MPa and in a natural gas hydrate NaCl salt solution in the condition that $T_1=3°$ C., $P_1=20.0$ MPa and a mass fraction is 3.5%. A use method of the measuring device for gas solubility in a natural gas hydrate solution system comprises the following steps:

(1) Before an experiment, measuring and calibrating volumes of the balancing chamber 12 and the expansion chamber 24, and using the analytical balance 29 to measure mass of the expansion chamber 24, which is recorded as $m_1$;

(2) Using deionized water to clean the balancing chamber 12, connecting experimental devices, closing all valves, then setting the initial temperature of the temperature adjusting tank 26 to be 15° C., and turning on the data acquisition device 27;

(3) Checking tightness of experimental systems: opening the gas inlet valve 9, the first sampling valve 21 and the second sampling valve 23, then opening the fifth valve 20, using the vacuum pump 19 to vacuumized the experimental devices and the pipelines, monitoring system pressure by the data acquisition device 27 until the system pressure becomes lower than 1 kPa, and holding for 30 min; if the system pressure is still lower than 1 kPa, opening the gas inlet valve 9 and the second valve 5 in sequence, and using the high pressure metering pump 3 to charge methane gas of 10 MPa into the systems; and if the change of the system pressure is less than 1 kPa after 2 hours, the tightness of the systems is considered good;

(4) Opening the safety valve 11, and discharging the methane gas; when it is detected by the data acquisition device 27 that the system pressure drops to about atmospheric pressure (101.325 kPa), closing the safety valve 11, opening the fifth valve 20, using the vacuum pump 19 to vacuumized the experimental devices and the pipelines, and then closing all valves;

(5) Opening the sample inlet valve 18, using the water injection high pressure metering pump 17 to inject liquid in the water storage tank 15 into the balancing chamber 12 until the balancing chamber 12 is filled up with target liquid, and then closing the sample inlet valve 18;

(6) Opening the gas inlet valve 9 and the second valve 5 in sequence, using the gas injection high pressure metering pump 3 to charge a certain amount of methane gas into the balancing chamber 12 in order to make the pressure in the balancing chamber 12 higher than the phase equilibrium pressure of methane hydrate at a target temperature, then closing the gas inlet valve 9 and the second valve 5 in sequence, monitoring the temperature and the pressure in the balancing chamber 12 by the data acquisition device 27, at the same time, turning on the electromagnetic stirrer 14, and using the electromagnetic stirring rod 13 to stir the liquid in the balancing chamber 12 in order to accelerate gas dissolution;

(7) Adjusting temperature in the temperature adjusting tank 26 from 15° C. to 3° C. at a speed of 2.5° C./h, and keeping the temperature unchanged at 3° C.; at this temperature, the phase equilibrium pressure of the methane hydrate system in the water solution is 3.85 MPa, and the phase equilibrium pressure of the methane hydrate system in the NaCl solution with the mass fraction of 3.5% is 3.98 MPa; ensuring that the pressure in the balancing chamber is higher than the phase equilibrium pressure of methane hydrate in order to guarantee that the temperature and pressure conditions of the reaction system are in a hydrate stable range, and at the same time, turning on the stirrer 25 to make the balancing chamber temperature distribution in the temperature adjusting tank more uniform; when it is detected that the pressure in the balancing chamber 12 drops significantly and keeps unchanged for more than 18 hours, it is proved that hydrate is generated and equilibrium is achieved in the balancing chamber, and the electromagnetic stirrer 14 turned on in step (6) can accelerate hydrate generation in this step;

(8) Opening the first sampling valve 21, filtering a solution sample with the microfilter 22 to ensure that the liquid sample taken does not contain hydrate crystals; the microfilter 22 can withstand a pressure difference of 30 MPa and can separate crystal particles with a size of greater than 25 nm from the sample;

(9) Rapidly opening the second sampling valve 23, after collecting a certain amount of sample into the pre-vacuumized expansion chamber 24, closing the second sampling valve 23, removing the expansion chamber 24 from the measuring system, and completing sample collection;

(10) During sampling, opening the second valve 5 and the gas inlet valve 9, turning on the electric pump 4 to push the movable piston 8 in the surge tank 7 to move upwards, and keeping the pressure in the balancing chamber 12 constant during sampling so as to avoid damage to phase equilibrium and dissolution equilibrium of the hydrate system, and closing the second valve 5 and the gas inlet valve 9;

(11) Using the analytical balance 29 to weigh the expansion chamber 24, recording the mass as $m_2$, flashing the taken sample into a gas phase and a liquid phase at atmospheric pressure (101.325 kPa) and room temperature (20° C.), and measuring a gas volume $V_g$ after flash by the gas meter 28;

(12) Calculating solubility: obtaining gas solubility $S_H$ by calculating from the sample mass $m=m_2-m_1$, the gas volume $V_g$ after sample flash and a mole number of gas contained in the solution after flash in steps (1) and (11) as well as a flash temperature T and a gas fugacity $f_g$; the gas volume $V_g$ can be directly measured by the gas meter, and the mole number of gas contained in the solution after flash need to be calculated from a mole number $n_w$ of water, the gas fugacity $f_g$ and a Henry's law constant H; since natural gas hydrate usually exists in seabed and a large amount of NaCl is contained in seawater, when measuring gas solubility $S_B$ in a natural gas hydrate salt solution, it is also necessary to consider the influences of a salting out constant $K_s$ and an ion concentration I;

(13) After the experiment, opening the safety valve 11 to depressurize the experimental devices, and opening the first sampling valve 21, the second sampling valve 23 and the gas inlet valve 9, vacuumizing test systems to discharge gas sample, and conducting a next experiment; and

(14) To ensure test accuracy, making measurements for more than three times at each experimental point to ensure the consistency of experimental results.

Experimental Data Processing Method

As direct measurement results of the above-mentioned measuring device for gas solubility in a natural gas hydrate solution system are weight, volume, temperature, pressure, etc., data processing is required to express the measurement results as a mole fraction of the gas in the liquid in order to represent the gas solubility.

To test the feasibility and accuracy of measurement made by the device and method, in this example, a natural gas hydrate water solution in the condition that $T_0=3°$ C. and $P_0=5.0$ MPa and a natural gas hydrate NaCl salt solution in the condition that $T_1=3°$ C., $P_1=20.0$ MPa and a mass fraction is 3.5% are sampled for three times respectively; samples are flashed in the condition that $T=20°$ C. and $P=101.325$ kPa; and the calculated solubility data of methane gas is compared with the data of a methane solubility prediction model to verify the measuring effect of the device and method.

When a hydrate-containing liquid is only pure water, the gas solubility of methane is represented by $S_H$:

$$m = n_g M_g + n_w M_w \quad (1)$$

where m is the sample mass and $m=m_2-m_1$, $m_1$ is the mass of the expansion chamber before sampling, and $m_2$ is the mass of the expansion chamber after sampling; in this example, the natural gas hydrate water solution is sampled for three times, the mass $m_1$ of the expansion chamber before sampling is respectively 300.1368 g, 300.1352 g and 300.1381 g, the mass $m_2$ of the expansion chamber after sampling is respectively 330.1422 g, 330.1301 g and 330.1509 g, and it is calculated that the mass m of the sample taken is respectively 30.0054 g, 29.9949 g and 30.0128 g; $n_g$ and $n_w$ are respectively the mole number of methane gas dissolved in the solution and the mole number of water; $M_g$ and $M_w$ are respectively the mole masses of methane gas and water dissolved in the solution, where $M_g=16.04$ g/mol, and $M_w=18.02$ g/mol $n_g$ can be calculated by the following formula:

$$n_g = \frac{f_g V_g}{ZRT} + n_w \frac{f_g}{H} \quad (2)$$

$n_w$ can be calculated by the following formula:

$$n_w = \frac{m - M_g \frac{f_g V_g}{ZRT}}{M_w + \frac{f_g}{H} M_g} \quad (3)$$

where $f_g$ is the gas fugacity, Z is a gas compression factor, R is a gas constant, T represents ambient temperature, H is the Henry's law constant, $V_g$ is the gas volume in the sample after flash measured by the gas meter, and the value of $V_g$ measured in this example is respectively 53.5 cm³, 53.2 cm³ and 54.0 cm³.

It is known that T=20° C.=293.15 K, R=8.314 J/(mol·K), and Z=0.995 for methane gas, so the Henry's law constant H can be calculated by the following formula:

$$\log_{10}(H/atm) = A + B \times 10^3/T + C \times \log_{10}(T) + D \times T \quad (4)$$

For methane gas, A=146.8858, B=−5.76834, C=−51.9144, and D=0.0184936, so it can be obtained that when T=20° C., H=35695.49 atm=3616.85 MPa.

The gas fugacity $f_g$ can be calculated by the following formula:

$$f_g \varphi_g P_g = \varphi_g (P - P_w) \approx P - P_w \quad (5)$$

where $\varphi_g$ is a fugacity coefficient; as flash is conducted at atmospheric pressure (P=101.325 kPa), the fugacity coefficient $\varphi_g$ is approximately equal to 1; $P_g$ is a partial pressure of the gas phase; P is atmospheric pressure; $P_w$ is a vapor pressure of water at ambient temperature (T=20° C.), which is equal to a partial pressure of water in the gas phase; it is known that P=101.325 kPa, and it can be obtained by referring to a Temperature vs Water Vapor Pressure chart that $P_w$=2.3381 kPa, so the gas fugacity $f_g$=98.9869 kPa.

By substituting the known data, it can be obtained that the mole number $n_g$ of methane gas dissolved in the sample obtained by sampling in the three times in the example is respectively 2.1838×10$^{-3}$ mol, 2.1715×10$^{-3}$ mol and 2.2042×10$^{-3}$ mol; the mole number $n_w$ of water in the sample taken is respectively 1.6631 mol, 1.6626 mol and 1.6635 mol.

To sum up, the gas solubility $S_H$ of methane in the natural gas hydrate water solution is:

$$S_H = \frac{n_g}{n_g + n_w} \quad (6)$$

It is calculated that the gas solubility $S_H$ (expressed by mole fraction) of methane in the sample of the natural gas hydrate water solution obtained by sampling in the three times in the example is respectively 1.3113×10$^{-3}$, 1.3044×10$^{-3}$ and 1.3233×10$^{-3}$; by expressing the gas solubility $S_H$ by molality, it can be obtained that the gas solubility in the sample taken in the three times is respectively 7.2866×10$^{-2}$ mol/kg, 7.2483×10$^{-2}$ mol/kg and 7.3530×10$^{-2}$ mol/kg; the gas solubility of methane in the sample of the natural gas hydrate water solution obtained by the solubility prediction model in the same temperature and pressure conditions is about 7.2792×10$^{-2}$ mol/kg; after comparison, the errors of the measurement results are within 1%, and the accuracy is relatively high.

When the hydrate-containing liquid is a salt solution (in this example, a 3.5% NaCl solution is taken as a research object), the gas solubility is represented by $S_B$:

The mass of the sample taken is:

$$m = m_2 - m_1 = n_g M_g + n_w M_w + n_s M_s \quad (7)$$

where $n_s$ is the mole number of NaCl, $M_s$ is the molar mass of NaCl, and $M_s$=58.44 g/mol; in this example, the natural gas hydrate salt solution is sampled for three times, the mass $m_1$ of the expansion chamber before sampling is respectively 300.1365 g, 300.1329 g and 300.1372 g, the mass $m_2$ of the expansion chamber after sampling is respectively 330.1453 g, 330.1344 g and 330.1419 g, and it is calculated that the mass m of the sample taken is respectively 30.0088 g, 30.0015 g and 30.0047 g.

Considering that a mass concentration $C_s$ of salt may be used as a calculating parameter during calculation:

$$C_s = \frac{n_s M_s}{n_w M_w + n_s M_s} \quad (8)$$

In this example, $C_s$=3.5%.

Considering that the influence of the salting out constant $K_s$ and the ion concentration I, the mole number of gas dissolved in the sample is:

$$n_g = \frac{f_g V_g}{ZRT} + n_w \frac{f_g}{H} \times 10^{-K_s I} \quad (9)$$

The mole number of water in the solution sample taken is:

$$n_w = \frac{m - M_g \dfrac{f_g V_g}{ZRT}}{\dfrac{M_w}{1 - C_s} + \dfrac{f_g}{H} M_g \times 10^{-K_s I}} \quad (10)$$

The calculation formula of the salting out constant $K_s$ of the NaCl solution is:

$$K_s = \lg\left(\frac{S^0}{S}\right)/C' \quad (11)$$

$S^0$ and S respectively refer to the solubility of a solute in pure water and in a salt solution with a molar concentration of C'; according to the solubility of methane gas in pure water and in a NaCl solution with a molar concentration of 1 mol/L, it can be obtained that $K_s$=0.128 mol/L.

The calculation formula of the ion concentration I is $$I = \frac{1}{2}\sum_{i=1}^{n} c_i z_i^2,$$

where $c_i$ represents the molality (in mol/L) of ion i, and $z_i$ is a charge number of the ion; as the charge numbers of Na$^+$ and Cl$^-$ are respectively +1 and −1, it can be obtained that the ion concentration I of the NaCl solution is:

$$I = c_i = \frac{1000 n_s}{(n_s M_s + n_w M_w)/\rho} \quad (12)$$

where $\rho$ is a density of the NaCl solution with a mass fraction of 3.5%, and $\rho$=1.0235 g/cm$^3$, so it can be obtained that I=0.585 mol/L.

When T=20° C., the Henry's law constant of methane in the NaCl solution with a mass fraction of 3.5% is H=4445 MPa.

The value of $V_g$ measured in this example is respectively 41.8 cm$^3$, 42.1 cm$^3$ and 41.5 cm$^3$; by substituting the known data, it can be obtained that the mole number $n_g$ of methane gas dissolved in the sample obtained by sampling in the three times in the example is respectively 1.7363×10$^{-3}$ mol, 1.7485×10$^{-3}$ mol and 1.7240×10$^{-3}$ mol; the mole number $n_w$ of water in the sample taken is respectively 1.6055 mol, 1.6051 mol and 1.6053 mol; and the mole number $n_s$ of NaCl in the sample taken is respectively $1.7956\times10^{-2}$ mol, $1.7951\times10^{-2}$ mol and $1.7954\times10^{-2}$ mol.

To sum up, the gas solubility $S_B$ of methane in the natural gas hydrate NaCl salt solution is:

$$S_B = \frac{n_g}{n_g + n_w + n_s} \quad (13)$$

It is calculated that the gas solubility $S_B$ (expressed by mole fraction) of methane in the sample of the natural gas hydrate salt solution obtained by sampling in the three times in the example is respectively $1.0683\times10^{-3}$, $1.0761\times10^{-3}$ and $1.0610\times10^{-3}$; by expressing the gas solubility $S_B$ by molality, it can be obtained that the gas solubility in the sample taken in the three times is respectively $5.7913\times10^{-2}$ mol/kg, $5.8336\times10^{-2}$ mol/kg and $5.7512\times10^{-2}$ mol/kg; the gas solubility of methane in the sample of the natural gas hydrate NaCl salt solution obtained by the solubility prediction model in the same temperature and pressure conditions is about $5.7241\times10^{-2}$ mol/kg; after comparison, the errors of the measurement results are within 2%, and the accuracy is relatively high.

The invention claimed is:

1. A method of measuring gas solubility in a natural gas hydrate solution system, wherein the measuring method is achieved based on a measuring device for gas solubility in a natural gas hydrate solution system, the measuring device comprising a reaction system, a sampling system and a data analysis system; the reaction system comprises a gas sample bottle, a gas injection high pressure metering pump, a surge tank, a balancing chamber, an electromagnetic stirring rod, an electromagnetic stirrer, a water storage tank, a water injection high pressure metering pump and a temperature adjusting tank; the surge tank, the balancing chamber and the electromagnetic stirrer are located in the temperature adjusting tank; the gas sample bottle is connected to the gas injection high pressure metering pump through a pipeline with a first valve; the surge tank is internally provided with a piston and divided by the piston into an upper chamber and a lower chamber, a temperature sensor and a pressure sensor are installed in the upper chamber of the surge tank, and the upper chamber of the surge tank is connected to the gas injection high pressure metering pump through a pipeline with a second valve; the balancing chamber, as a gas dissolving and hydrate generating device, is provided with a visualization window, a temperature sensor and a pressure sensor, is connected to the water injection high pressure metering pump through a sample inlet valve, and is connected to the upper chamber of the surge tank through a pipeline with a gas inlet valve; the electromagnetic stirring rod is placed in the balancing chamber and is driven by the electromagnetic stirrer installed at the bottom; the water storage tank is connected to the water injection high pressure metering pump through a pipeline with a fourth valve;

the sampling system comprises an electric pump, a microfilter, and an expansion chamber; the electric pump is connected to the lower chamber of the surge tank through a third valve, and the electric pump is used in conjunction with the surge tank provided with the movable piston to keep pressure in the balancing chamber constant during sampling; the microfilter is connected to the balancing chamber through a first sampling valve; the expansion chamber, as a liquid sample collecting device, is internally provided with a temperature sensor and a pressure sensor, and is connected to the microfilter through a pipeline of a second sampling valve; the microfilter and the expansion chamber are also placed in the temperature adjusting tank;

devices of the data analysis system mainly include a data acquisition device, a gas meter, and an analytical balance; the temperature sensors and the pressure sensors in the surge tank, the balancing chamber and the expansion chamber are connected to the data acquisition device; the gas meter and the analytical balance are used for flash data analysis of a sample taken in the expansion chamber;

wherein the method comprising the following steps:
1) cleaning the balancing chamber, connecting measuring device, and conducting pressure test and inspection on the measuring device;
2) using a vacuum pump to vacuumized the measuring device and the pipeline with a first valve, the pipeline with a second valve, the pipeline with a gas inlet valve, the pipeline with a fourth valve, the pipeline of a second sampling valve, and then closing all valves;
3) opening the sample inlet valve, and using the water storage tank and the water injection high pressure metering pump to fill up the balancing chamber with solvent liquid;
4) opening the second valve and the gas inlet valve, charging methane gas into the balancing chamber by the gas sample bottle and the gas injection high pressure metering pump, and then monitoring temperature and pressure in the balancing chamber;
5) adjusting temperature in the temperature adjusting tank to a hydrate generating temperature, and keeping this temperature constant, achieving equilibrium in the balancing chamber when it is detected that the pressure in the balancing chamber is constant for a long time;
6) opening the first sampling valve, and filtering a solution sample with the microfilter to ensure that the liquid sample taken does not contain hydrate crystals;
7) opening the second sampling valve, after collecting a certain amount of liquid sample into the expansion chamber, which is pre-vacuumized, removing the expansion chamber from the measuring device, and completing sample collection;
8) during sampling, opening the third valve and the gas inlet valve, conducting pressurization by the electric pump, and keeping the pressure in the balancing chamber constant during sampling;
9) using the analytical balance to weigh the sample taken in the expansion chamber, recording a sample mass as m, flashing the sample in the expansion chamber into a gas phase and a liquid phase at atmospheric pressure and room temperature, and measuring a gas volume $V_g$ after flash by the gas meter;
10) solubility calculation
obtaining gas solubility $S_H$ in a natural gas hydrate water solution by calculating from a mole number $n_g$ of gas and a mole number $n_w$ of water in the water solution according to a formula $$S_H = \frac{n_g}{n_g + n_w},$$

where $n_g$ and $n_w$ are obtained by calculating from a gas molar mass $M_g$, a water molar mass $M_w$, a gas compression factor Z, a gas constant R, a flash temperature T, a gas fugacity $f_g$, a Henry's law constant H, and the sample mass m and the gas volume $V_g$ after sample flash obtained in step 9) according to formulas $$n_g = \frac{f_g V_g}{ZRT} + n_w \frac{f_g}{H} \text{ and } n_w = \frac{m - M_g \frac{f_g V_g}{ZRT}}{M_w + \frac{f_g}{H} M_g};$$

and obtaining gas solubility $S_B$ in a natural gas hydrate salt solution by calculating from the mole number $n_g$ of gas, the mole number $n_w$ of water and a mole number $n_s$ of salt according to a formula $$S_B = \frac{n_g}{n_g + n_w + n_s},$$

wherein as the gas solubility in the salt solution is also influenced by a salting out constant $K_s$ and an ion concentration I, the gas mole number $$n_g = \frac{f_g V_g}{ZRT} + n_w \frac{f_g}{H} \times 10^{-K_s I}.$$

2. The method of gas solubility in a natural gas hydrate solution system according to claim 1, wherein the temperature adjusting tank is internally provided with a stirrer driven by a motor.

3. The method of gas solubility in a natural gas hydrate solution system according to claim 1, wherein the balancing chamber is provided with a relief valve used for exhausting of the balancing chamber and the whole measuring device.

4. The method of gas solubility in a natural gas hydrate solution system according to claim 1, wherein the measuring device further comprises a vacuum pump which is connected to the balancing chamber through a pipeline with a fifth valve so as to act on the measuring device for gas solubility.

5. The method of gas solubility in a natural gas hydrate solution system according to claim 1, wherein in step 4), the liquid is stirred by the electromagnetic stirring rod placed in the balancing chamber until pressure reading keeps constant.

6. The method of gas solubility in a natural gas hydrate solution system according to claim 1, wherein the stirrer is always in an operating state during operation in order to make the temperature in the temperature adjusting tank evenly distributed.

* * * * *